US011017392B2

(12) United States Patent
Ma et al.

(10) Patent No.: US 11,017,392 B2
(45) Date of Patent: May 25, 2021

(54) METHOD, APPARATUS AND ELECTRONIC DEVICE FOR BLOCKCHAIN TRANSACTIONS

(71) Applicant: ADVANCED NEW TECHNOLOGIES CO., LTD., Grand Cayman (KY)

(72) Inventors: Baoli Ma, Hangzhou (CN); Lichun Li, Hangzhou (CN); Wenbin Zhang, Hangzhou (CN); Zheng Liu, Hangzhou (CN); Shan Yin, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/882,841

(22) Filed: May 26, 2020

(65) Prior Publication Data

US 2020/0286083 A1 Sep. 10, 2020

Related U.S. Application Data

(63) Continuation of application No. 16/533,704, filed on Aug. 6, 2019.

(30) Foreign Application Priority Data

Aug. 13, 2018 (CN) .......................... 201810917787.6

(51) Int. Cl.
*G06Q 20/38* (2012.01)
*G06F 16/23* (2019.01)

(52) U.S. Cl.
CPC ....... *G06Q 20/389* (2013.01); *G06F 16/2308* (2019.01); *G06F 16/2365* (2019.01);
(Continued)

(58) Field of Classification Search
CPC .............. G06Q 20/389; G06F 16/2379; G06F 16/2308; G06F 16/2365
See application file for complete search history.

(56) References Cited

U.S. PATENT DOCUMENTS 9,569,771 B2 2/2017 Lesavich et al.
10,354,236 B1 7/2019 Wang
(Continued)

FOREIGN PATENT DOCUMENTS

CN 106548330 A 3/2017
CN 107038638 A 8/2017
(Continued)

OTHER PUBLICATIONS

Ibrahim, Ahmed; Singhal, Mukesh; A New Authentication Protocol for an Autentication-sa-a-Service (AssS) Cloud using Pedersen Commitment Scheme; 2016; Section IV. (Year: 2016).*
(Continued)

*Primary Examiner* — Steven S Kim
*Assistant Examiner* — Terry Nathan Murray (57) ABSTRACT

The application provides a method, apparatus, and electronic device for implementing blockchain-based transactions. The method comprises: determining a plurality of blockchain-based transactions to be executed among a transaction-initiating party, a transaction-relay party, and a transaction-target party in a blockchain; generating common transaction data and first independent transaction data, wherein: the common transaction data is related to the plurality of blockchain-based transactions, and the first independent transaction data is related to one or more of the plurality of blockchain-based transactions involving the transaction-initiating party; obtaining second independent transaction data, wherein: the second independent transaction data is related to one or more of the plurality of blockchain-based transactions involving the transaction-relay party; and submitting (Continued)

a consolidated transaction related to the plurality of blockchain-based transactions to the blockchain, wherein the consolidated transaction comprises the common transaction data, the first independent transaction data, and the second independent transaction data.

18 Claims, 4 Drawing Sheets

(52) U.S. Cl.
CPC ..... *G06F 16/2379* (2019.01); *G06Q 20/3825* (2013.01); *G06Q 20/3829* (2013.01); *G06Q 2220/00* (2013.01)

(56) References Cited

U.S. PATENT DOCUMENTS

| | | | |
|---|---|---|---|
| 10,417,217 B2 | 9/2019 | Pierce et al. | |
| 10,496,923 B2 | 12/2019 | Katz et al. | |
| 2002/0052853 A1* | 5/2002 | Munoz | G06Q 20/027 705/79 |
| 2002/0095370 A1* | 7/2002 | Ebata | G06Q 20/3678 705/39 |
| 2006/0041760 A1* | 2/2006 | Huang | G06F 21/552 713/189 |
| 2008/0067240 A1* | 3/2008 | Nakano | G06Q 20/341 235/380 |
| 2010/0223172 A1* | 9/2010 | Donnelly | G06F 19/328 705/34 |
| 2011/0055585 A1* | 3/2011 | Lee | H04L 9/0844 713/183 |
| 2017/0091756 A1 | 3/2017 | Stern et al. | |
| 2017/0206604 A1* | 7/2017 | Al-Masoud | G06F 16/951 |
| 2017/0243215 A1 | 8/2017 | Stifford et al. | |
| 2017/0337534 A1 | 11/2017 | Goeringer et al. | |
| 2017/0344988 A1 | 11/2017 | Cusden et al. | |
| 2017/0352027 A1 | 12/2017 | Zhang et al. | |
| 2017/0366527 A1* | 12/2017 | Oxford | H04L 63/062 |
| 2019/0172026 A1 | 6/2019 | Vessenes et al. | |
| 2019/0228388 A1 | 7/2019 | Hu et al. | |
| 2019/0334920 A1* | 10/2019 | Kelly | H04L 9/3239 |
| 2019/0378127 A1* | 12/2019 | Dudar | H04L 9/3239 |

FOREIGN PATENT DOCUMENTS

| | | | |
|---|---|---|---|
| CN | 107147735 A | 9/2017 | |
| CN | 107248994 A | 10/2017 | |
| CN | 107358420 A | 11/2017 | |
| CN | 108027867 A | 5/2018 | |
| CN | 108256973 A | 7/2018 | |
| CN | 108259594 A | 7/2018 | |
| CN | 108364229 A | 8/2018 | |
| CN | 109087080 A | 12/2018 | |
| CN | 107888562 B | 12/2019 | |
| EA | 1056053 A3 * | 5/2000 | .......... H04L 9/3066 |
| JP | 5389542 B1 | 9/2018 | |
| KR | 101918033 B1 | 11/2018 | |
| WO | 2014/201059 A1 | 12/2014 | |

OTHER PUBLICATIONS

Nabeel, Mohamed; Keer, Sam; Ding, Xiaoyu; Bertino, Elisa; Authentication and Key Management for Advanced Metering Infrastructures Utilizing Physically Unclonable Functions; 2012, IEEE Symposium. (Year: 2012).*
A. Ibrahim and M. Singhal, "A new authentication protocol for an Authentication-as-a-Service (AaaS) cloud using Pedersen commitment scheme," 2016 International Conference on Industrial Informatics and Computer Systems (CIICS), Sharjah, 2016, pp. 1-6, doi: 10.1109/ICCSII.2016.7462403. (Year: 2016).*
Search Report for Taiwanese Application No. 108110711 dated Oct. 30, 2019.
First Search Report for Chinese Application No. 201810917787.6 dated Feb. 21, 2020.
Meng, "Blockchain study I What is the off-chain transaction and intra-chain transaction of the blockchain", Oct. 17, 2017, https://www.leiphone.com/news/201710/YnKwzpl1JSOXsFtM.html?spm=a2c4e.10696291.0.0.478619a4UnriDP.
Written Opinion for International Application No. PCT/US2019/045370 dated Jun. 15, 2020.
Supplementary Search for Chinese Application No. 201810917787.6 dated May 6, 2020.
Written Opinion of the International Searching Authority and International Search Report for PCT Application No. PCT/ US2019/045370 dated Oct. 31, 2019 (16 pages).
Antonopoulos, "Mastering Bitcoin," Jul. 21, 2017, pp. 284-304 (23 pages).
Lind et al., "Teechain: A Secure Asynchronous Blockchain Payment Network," Cornell University Library, Jul. 18, 2011 28 pages).
Poon et al., "The Bitcoin Lightning Network: Scalable Off-Chain Instant Payments," Jan. 14, 2016 (60 pages).
Lin et al., "Rapido: A Layer2 Payment System for Decentralized Currencies," Cornell University Library, Aug. 5, 201! 10 pages).
Miller et al., "Sprites and State Channels: Payment Networks that Go Faster than Lightning," Nov. 30, 2017 (24 pages).
Malavolta et al., "Concurrency and Privacy with Payment-Channel Networks," IACR, Sep. 6, 2017 (28 pages).
Heilman et al., "Blindly Signed Contracts: Anonymous On-Blockchain and Off-Blockchain Bitcoin Transactions," Aug. 31, 2016, Intelligent Virtual Agent, IVA 20165, Aug. 31, 2016 (18 pages).
Dziembowski et al., "PERUN: Virtual Payment Channels over Cryptographic Currencies," IACR, Jun. 26, 2017 (62 pages).
Heilman et al., "TumbleBit: An Untrusted Bitcoin-Compatible Anonymous Payment Hub," IACR, Aug. 27, 2016 (30 pages).

* cited by examiner

```
┌─────────────────────────────────────────────────────────┐
│ Determining multiple blockchain-based transactions to be executed │
│ among the transaction-initiating party, a transaction-relay party, and a │ ~ 102
│ transaction-target party in a blockchain                │
└─────────────────────────────────────────────────────────┘
                            │
                            ▼
┌─────────────────────────────────────────────────────────┐
│ Generating first transaction data which comprises common │
│ transaction data and first independent transaction data, wherein the │
│ common transaction data is related to the multiple blockchain-based │ ~ 104
│ transactions, and the first independent transaction data is related to │
│ one or more of the multiple blockchain-based transactions into which │
│ the transaction-initiating party enters │
└─────────────────────────────────────────────────────────┘
                            │
                            ▼
┌─────────────────────────────────────────────────────────┐
│ Obtaining second transaction data which comprises second │
│ independent transaction data, wherein the second independent │
│ transaction data is generated by a transaction-relay party for one or │ ~ 106
│ more of the multiple blockchain-based transactions into which the │
│ transaction-relay party enters when the verification of the common │
│ transaction data is successful │
└─────────────────────────────────────────────────────────┘
                            │
                            ▼
┌─────────────────────────────────────────────────────────┐
│ Submitting a consolidated transaction related to the multiple │
│ blockchain-based transactions to the blockchain, wherein the │ ~ 108
│ consolidated transaction comprises the first transaction data and the │
│ second transaction data │
└─────────────────────────────────────────────────────────┘
```

METHOD, APPARATUS AND ELECTRONIC DEVICE FOR BLOCKCHAIN TRANSACTIONS

CROSS REFERENCE TO RELATED APPLICATION

The present application is a continuation of U.S. application Ser. No. 16/533,704 filed Aug. 6, 2019, and titled "Method, Apparatus and Electronic Device for Blockchain Transactions," which is based on and claims priority to Chinese Patent Application No. 201810917787.6, filed on Aug. 13, 2018. All of the above applications are incorporated herein by reference in their entirety.

TECHNICAL FIELD

One or more embodiments of the present specification relate to the technical field of blockchain, particularly to a method, apparatus, and electronic device for implementing blockchain-based transactions.

BACKGROUND

Blockchain nodes of a blockchain network may jointly maintain a unified blockchain ledger through a consensus reached among the blockchain nodes, to record data of transactions having occurred on the blockchain network. The blockchain ledger may be made public for viewing and verification of historical data of the occurred transactions at any time.

SUMMARY

According to a first aspect of one or more embodiments of the specification, a method for implementing blockchain-based transactions is provided. The method is implementable by a computing device, and may comprise: determining a plurality of blockchain-based transactions to be executed among a transaction-initiating party, a transaction-relay party, and a transaction-target party in a blockchain; generating common transaction data and first independent transaction data, wherein: the common transaction data is related to the plurality of blockchain-based transactions, and the first independent transaction data is related to one or more of the plurality of blockchain-based transactions involving the transaction-initiating party; obtaining second independent transaction data, wherein: the second independent transaction data is related to one or more of the plurality of blockchain-based transactions involving the transaction-relay party; and submitting a consolidated transaction related to the plurality of blockchain-based transactions to the blockchain, wherein the consolidated transaction comprises the common transaction data, the first independent transaction data, and the second independent transaction data.

In some embodiments, before determining a plurality of blockchain-based transactions to be executed among a transaction-initiating party, a transaction-relay party, and a transaction-target party in a blockchain, the method may further comprise: determining a transaction path which comprises a first computing device associated with the transaction-initiating party, a second computing device associated with the transaction-relay party, and a third computing device associated with the transaction-target party. In addition, determining a plurality of blockchain-based transactions to be executed among a transaction-initiating party, a transaction-relay party, and a transaction-target party in a blockchain may comprise: determining the plurality of blockchain-based transactions to be executed among the transaction-initiating party, the transaction-relay party, and the transaction-target party in the blockchain based on the transaction path.

In some embodiments, the transaction-initiating party is associated with a first blockchain account address, the transaction-relay party is associated with a second blockchain account address, and the transaction-target party is associated with a third blockchain account address; and each of the plurality of blockchain-based transactions is related to two or more of the first blockchain account address, the second blockchain account address, and the third blockchain account address.

In some embodiments, before obtaining the second independent transaction data, further comprising: sending the common transaction data to a computing device associated with the transaction-relay party via an off-chain channel, for the computing device associated with the transaction-relay party to verify the common transaction data.

In some embodiments, the second independent transaction data is generated by the computing device associated with the transaction-relay party in response to a successful verification of the common transaction data, and obtaining the second independent transaction data comprises: receiving the second independent transaction data from the computing device associated with the transaction-relay party via the off-chain channel.

In some embodiments, the method may further comprise: generating a first signature based on a private key of the transaction-initiating party, wherein the first signature endorses the common transaction data and the first independent transaction data, or endorses the consolidated transaction; and submitting the first signature and the consolidated transaction in association with each other to the blockchain.

In some embodiments, the method may further comprise: obtaining a second signature generated by a computing device associated with the transaction-relay party based on a private key of the transaction-relay party; and the second signature endorses the common transaction data and the second independent transaction data.

In some embodiments, the common transaction data comprises a transaction amount of each of the plurality of blockchain-based transactions.

In some embodiments, the first independent transaction data comprises one or more first input assets of the transaction-initiating party corresponding to the one or more blockchain-based transactions involving the transaction-initiating party; and the second independent transaction data comprises one or more second input assets of the transaction-relay party corresponding to the one or more blockchain-based transactions involving the transaction-relay party.

In some embodiments, the first independent transaction data comprises one or more first change output assets of the transaction-initiating party corresponding to the one or more blockchain-based transactions involving the transaction-initiating party; and the second independent transaction data comprises one or more second change output assets of the transaction-relay party corresponding to the one or more blockchain-based transactions involving the transaction-relay party.

In some embodiments, the first independent transaction data comprises a first range proof, and the second independent transaction data comprises a second range proof.

In some embodiments, the first independent transaction data comprises a proof that an input and an output of each of the one or more blockchain-based transactions involving the transaction-initiating party are equal; and the second independent transaction data comprises a proof that an input and an output of each of the one or more blockchain-based transactions involving the transaction-relay party are equal.

In some embodiments, the first independent transaction data comprises a proof that an account balance of the transaction-initiating party is not smaller than a total transaction amount of the one or more blockchain-based transactions involving the transaction-initiating party; and the second independent transaction data comprises a proof that an account balance of the transaction-relay party is not smaller than a total transaction amount of the one or more blockchain-based transactions involving the transaction-relay party.

In some embodiments, the method may further comprise: obtaining third transaction data, wherein the third transaction data comprises a third signature generated by a third computing device associated with the transaction-target party based on a private key of the transaction-target party in response to a successful verification of the common transaction data, the third signature endorsing the common transaction data.

According to a second aspect of one or more embodiments of the specification, an apparatus for implementing blockchain-based transactions is provided. The apparatus may comprise: one or more processors and one or more non-transitory computer-readable memories coupled to the one or more processors and configured with instructions executable by the one or more processors to cause the apparatus to perform operations comprising: determining a plurality of blockchain-based transactions to be executed among a transaction-initiating party, a transaction-relay party, and a transaction-target party in a blockchain; generating common transaction data and first independent transaction data, wherein: the common transaction data is related to the plurality of blockchain-based transactions, and the first independent transaction data is related to one or more of the plurality of blockchain-based transactions involving the transaction-initiating party; obtaining second independent transaction data, wherein: the second independent transaction data is related to one or more of the plurality of blockchain-based transactions involving the transaction-relay party; and submitting a consolidated transaction related to the plurality of blockchain-based transactions to the blockchain, wherein the consolidated transaction comprises the common transaction data, the first independent transaction data, and the second independent transaction data.

According to a third aspect of one or more embodiments of the specification, a non-transitory computer-readable storage medium is provided. The non-transitory computer-readable storage medium may be configured with instructions executable by one or more processors to cause the one or more processors to perform operations comprising: determining a plurality of blockchain-based transactions to be executed among a transaction-initiating party, a transaction-relay party, and a transaction-target party in a blockchain; generating common transaction data and first independent transaction data, wherein: the common transaction data is related to the plurality of blockchain-based transactions, and the first independent transaction data is related to one or more of the plurality of blockchain-based transactions involving the transaction-initiating party; obtaining second independent transaction data, wherein: the second independent transaction data is related to one or more of the plurality of blockchain-based transactions involving the transaction-relay party; and submitting a consolidated transaction related to the plurality of blockchain-based transactions to the blockchain, wherein the consolidated transaction comprises the common transaction data, the first independent transaction data, and the second independent transaction data.

DETAILED DESCRIPTION

Embodiments will be described in detail, with examples shown in the accompanying drawings. When the description below involves the accompanying drawings, unless otherwise indicated, the same numeral in different accompanying drawings stands for the same element or similar elements. The implementation manners described in the following embodiments do not represent all the implementation manners consistent with the present specification. Rather, they are only examples of the apparatuses and methods described in detail in the attached claims and consistent with some aspects of one or more embodiments of the present specification.

In some embodiments, it is not necessary to perform steps in the methods according to the sequence illustrated and described in the present specification. In some other embodiments, the steps of the methods may be more or less than those described in the present specification. Further, a single step described in the present specification may be split into multiple steps for description in other embodiments, while multiple steps described in the present specification may be merged into one single step for description in yet other embodiments.

Figure 1:
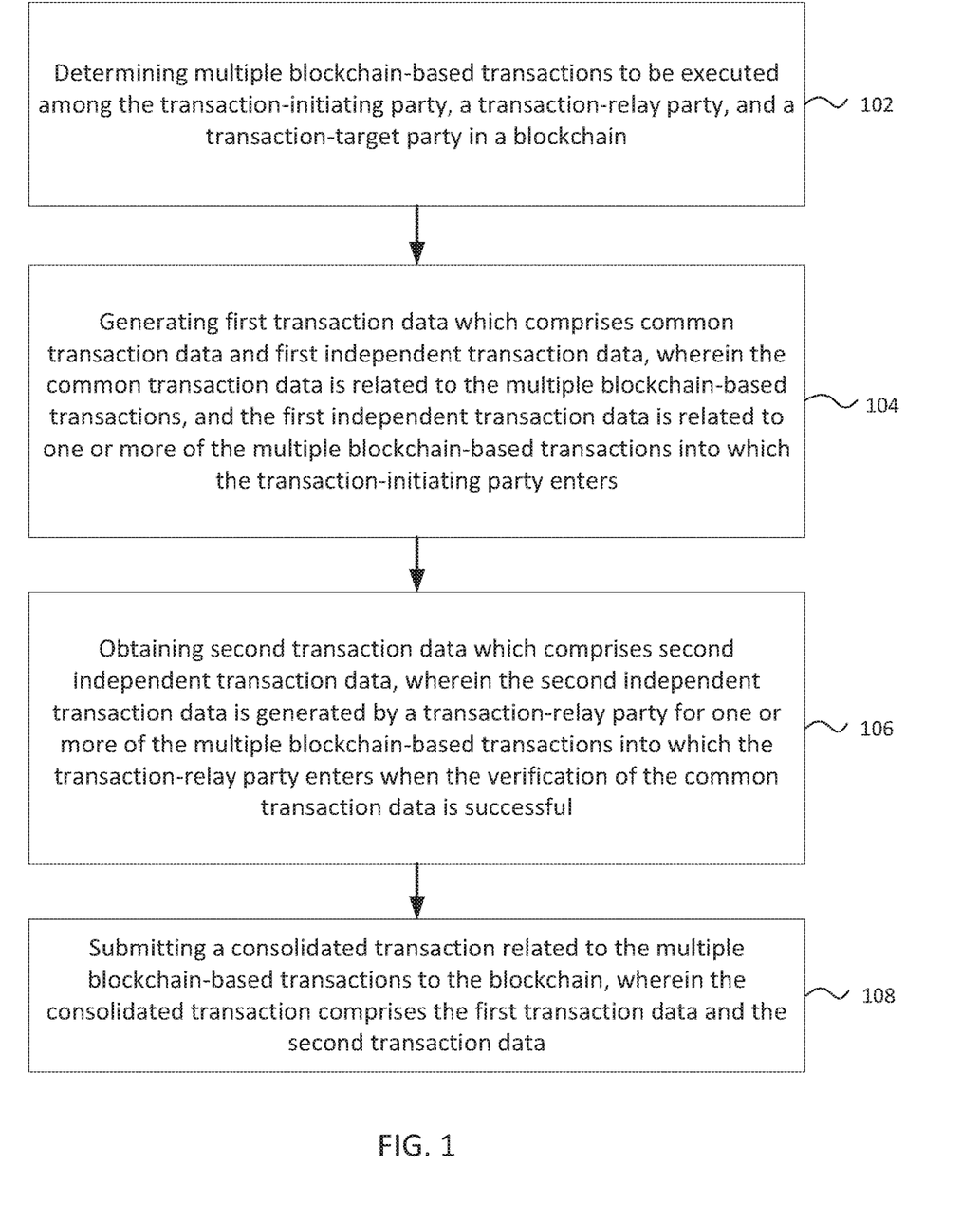
FIG. 1 is a flowchart of a method for implementing blockchain-based transactions according to some embodiments.

FIG. 1 is a flowchart of a method for implementing blockchain-based transactions according to some embodiments. As shown in FIG. 1, this method is implementable by a computing device associated with a transaction-initiating party and may comprise the following steps 102-108.

Step 102, determining multiple blockchain-based transactions to be executed among the transaction-initiating party, a transaction-relay party, and a transaction-target party in a blockchain.

The computing device may be a personal computer, a laptop computer, a cell phone, a camera phone, a smart phone, a PDA (personal digital assistant), a media player, a navigation device, an email sending and receiving device, a game console, a tablet computer, a wearable device or any combination of a few of these devices. The computing device associated with the transaction-initiating party may be referred to as a transaction-initiating party device. Another computing device may be associated with the transaction-relay party, and may be referred to as a transaction-relay party device. Still another computing device may be associated with the transaction-target party, and may be referred to as a transaction-target party device. For convenience and conciseness, in some embodiments, a computing device or computing devices may be omitted from the description of the parties.

In some embodiments, a transaction path between a transaction-initiating party device and a transaction-target party device may be determined according to the transaction-initiating party and the transaction-target party and based on the shortest path, the lowest fee, and/or other conditions. In some embodiments, the transaction path may include the transaction-initiating party device, the transaction-target party device, and one or more transaction-relay party devices, so that one or more transactions between the transaction-initiating party and the transaction-target party may be ultimately achieved through the relay of the one or more transaction-relay parties. When there is one transaction-relay party, the transaction path involves a blockchain-based transaction between the transaction-initiating party and the transaction-relay party, as well as a blockchain-based transaction between the transaction-relay party and the transaction-target party. When there are multiple transaction-relay parties, the transaction path involves a blockchain-based transaction between the transaction-initiating party and the first transaction-relay party, blockchain-based transaction(s) between connecting transaction-relay parties, as well as a blockchain-based transaction between the last transaction-relay party and the transaction-target party. That is, a blockchain-based transaction may occur between relaying parties on the transaction path, and these blockchain-based transactions may be implemented together in one or more bundles.

For example, in a cross-border remittance transaction, the transaction-initiating party is a remitter, and the transaction-target party is a remittee or receiver. A remitter may refer to a computing device configured to remit a fund or other resources to the receiver in the remittance transaction. A receiver may refer to a computing device configured to receive a fund or other resources from the remitter in the remittance transaction. A transaction path may be determined between the remitter and the remittee or receiver, via which the transaction amount of the remitter is transferred to the remittee or receiver. In addition, the multiple transactions involved in the transfer can be executed together. Executing together may refer to implementing synchronously, which does not necessarily mean implementing at the same time, but the implementation results of the transactions are the same: either all succeed or all fail. Executing the transactions together can avoid asset losses or complicated asset refund processes caused by partial execution of the transactions.

In some embodiments, the multiple blockchain-based transactions to be executed together (e.g., carried out in a bundle) do not necessarily have to have a unified purpose (e.g., transfer/remittance from the transaction-initiating party to the transaction-target party, etc.), but may be synchronously implemented for various reasons which are not limited by the specification.

In some embodiments, the blockchain-based transactions among the transaction-initiating party, the transaction-relay party, and the transaction-target party may involve the transaction of an asset certificate of a transaction amount. For example, the asset certificate may correspond to a token, a digital asset, or any other asset in a blockchain. Alternatively, the asset certificate may correspond to cash, security, discount coupon, real estate, and any other off-chain asset, which are not limited by the specification.

In some embodiments, the transaction-relay parties may charge transaction fees. A transaction fee may be subtracted from a transaction amount of each blockchain-based transaction involving a transaction-relay party. Therefore, the multiple blockchain-based transactions to be executed together may have different transaction amounts, and the differences between the transaction amounts may be the transaction fees charged by the transaction-relay parties. A transaction fee may be charged by a fixed amount or a predetermined percentage, which are not limited by the specification.

Step 104, generating first transaction data which comprises common transaction data and first independent transaction data, wherein the common transaction data is related to the multiple blockchain-based transactions, and the first independent transaction data is related to one or more of the multiple blockchain-based transactions into which the transaction-initiating party enters.

Step 106, obtaining second transaction data which comprises second independent transaction data, wherein the second independent transaction data is generated by a transaction-relay party for one or more of the multiple blockchain-based transactions into which the transaction-relay party enters when the verification of the common transaction data is successful.

In some embodiments, each transaction-relay party verifies the common transaction data, and generates corresponding second transaction data after determining that the verification is successful. Therefore, when there is one transaction-relay party, the transaction-initiating party can receive a piece of second transaction data from the transaction-relay party; when there are multiple transaction-relay parties, the transaction-initiating party can receive multiple pieces of second transaction data from these transaction-relay parties respectively, and these pieces of second transaction data have a one-to-one correspondence with these transaction-relay parties.

In some embodiments, the transaction-initiating party may send the first transaction data or the common transaction data to a transaction-relay party device via an off-chain channel, so that the transaction-relay party device can obtain and verify the common transaction data rapidly, and the transaction-initiating party device can receive the second transaction data returned by the transaction-relay party device via the off-chain channel.

In some embodiments, the second transaction data further comprises a second signature which is generated by a transaction-relay party device signing the second transaction data with a private key of the transaction-relay party. The second signature is related to and endorses the common transaction data and the second independent transaction data. The common transaction data is verified by the transaction-relay party device, and the second signature related to the common transaction data and the second independent transaction data is generated by the transaction-relay party device, thereby ensuring that the common transaction data and the second independent transaction data are not tampered with by any transaction party on the transaction path, and safeguarding the reliable implementation of blockchain-based transactions.

In some embodiments, in the scenario of the transfer/remittance from the transaction-initiating party to the transaction-target party, the common transaction data may comprise an individual transaction amount of each of the multiple blockchain-based transactions. If the transaction-relay party charges a relay fee, the transaction amount contained in the common transaction data may be an amount after the deduction of the relay fee. For example, when the transaction path is "a transaction-initiating party—a transaction-relay party—a transaction-target party," there may be a first blockchain-based transaction between the transaction-initiating party and the transaction-relay party, and a second blockchain-based transaction between the transaction-relay party and the transaction-target party. If the transaction-initiating party is to remit RMB 1000 Yuan and the relay fee charged by the transaction-relay party is 1%, the common transaction data may comprise a transaction amount RMB 1000 Yuan of the first blockchain-based transaction and a transaction amount of the second blockchain-based transaction that is RMB 1000×(1−1%)=990 Yuan.

In some embodiments, if an account balance model is used for conducting the transactions, a transaction amount contained in the common transaction data may represent an output of each blockchain-based transaction. If an Unspent Transaction Output (UTXO) model is used for conducting the transactions, a transaction amount contained in the common transaction data may represent a part of an output of each blockchain-based transaction, and the other part of the output may comprise a change. For example, the first independent transaction data may comprise one or more first change output assets of the transaction-initiating party corresponding to the one or more blockchain-based transactions into which the transaction-initiating party enters, and the second independent transaction data may comprise one or more second change output assets of the transaction-relay party corresponding to the one or more blockchain-based transactions into which the transaction-relay party enters.

In some embodiments, when the UTXO model is used for conducting the transactions, the first independent transaction data may comprise one or more first input assets of the transaction-initiating party corresponding to the one or more blockchain-based transactions into which the transaction-initiating party enters, and the second independent transaction data may comprise one or more second input assets of the transaction-relay party corresponding to the one or more blockchain-based transactions into which the transaction-relay party enters, to represent inputs of the blockchain-based transactions.

In some embodiments, when a private transaction mode is used for conducting a consolidated transaction including multiple blockchain-based transactions to be executed together (whether under the account balance model or the UTXO model), the transaction amounts, the inputs of transactions, the outputs of the transactions, etc., may be protected in the form of ciphertext for privacy. Therefore, the first independent transaction data may contain a first range proof, and the second independent transaction data may contain a second range proof, to enable the blockchain nodes in the blockchain to verify each blockchain-based transaction. For example, in the account balance model, the transaction amount of each transaction may be verified to be not smaller than zero; in the UTXO model, the output of each transaction may be verified to be not smaller than zero, and so on. By way of example, a Bulletproofs solution or a Borromean ring signature solution may be used for this purpose in the specification and are not limited by the specification.

In some embodiments, when the UTXO transaction model is used, the first independent transaction data further comprises a proof that the input and output of each blockchain-based transaction into which the transaction-initiating party enters are equal, wherein the input may include several assets provided by the transaction-initiating party, and the output may include one or more output assets for a transaction-relay party connected to the transaction-initiating party (the amount of the one or more output assets is the transaction amount of the transaction) and a change asset for the transaction-initiating party. Similarly, the second independent transaction data further comprises a proof that the input and output of each blockchain-based transaction into which the transaction-relay party enters are equal.

In some embodiments, when the account balance transaction model is used, the first independent transaction data further comprises a proof that an account balance held by the transaction-initiating party is not smaller than a total transaction amount of the one or more blockchain-based transactions into which the transaction-initiating party enters, to ensure that the account balance held by the transaction-initiating party is enough for carrying out the relevant one or more blockchain-based transactions. Similarly, the second independent transaction data further comprises a proof that an account balance held by the transaction-relay party is not smaller than a total transaction amount of the one or more blockchain-based transactions into which the transaction-relay party enters.

Step 108, submitting the consolidated transaction related to the multiple blockchain-based transactions to the blockchain, wherein the consolidated transaction comprises the first transaction data and the second transaction data.

In some embodiments, the consolidated transaction is submitted to the blockchain, so that multiple blockchain-based transactions are synchronously implemented in the blockchain so as to ensure that either all blockchain-based transactions succeed or all blockchain-based transactions fail. This can avoid asset losses of relevant transaction parties or complicated refund procedures caused by partial execution of the transactions.

In some embodiments, the transaction-initiating party may generate a first signature through a private key held by the transaction-initiating party. The first signature is related to the common transaction data and the first independent transaction data, or related to the consolidated transaction. The transaction-initiating party may submit the first signature and the consolidated transaction to the blockchain in an associated manner (e.g., in a manner indicating the first signature and the consolidated transaction are associated), which can be used to prevent relevant transaction data from being tampered with by other transaction parties.

In some embodiments, the transaction-initiating party can obtain third transaction data when the private transaction mode is used for conducting the consolidated transaction. The third transaction data may comprise a third signature which is generated by the transaction-target party signing the common transaction data through a private key the transaction-target party holds when the verification of the common transaction data is successful. The third signature can be used to prevent the common transaction data from being tampered with by any transaction party on the transaction path.

In some embodiments, when a non-private transaction mode is used, the private key used by each transaction party for signing may be related to the transaction party's identity. For example, the private key used by the transaction-initiating party may correspond to an address of the transaction-initiating party, the private key used by the transaction-relay party may correspond to an address of the transaction-relay party, and the private key used by the transaction-target party may correspond to an address of the transaction-target party.

In some embodiments, when a private transaction mode is used, the identity of each transaction party may be protected for privacy, and therefore the private key used by the each transaction party for signing may be a temporary private key generated by blockchain nodes of the blockchain for each transaction (of course, in some examples, a public key corresponding to the private key may also be generated).

In some embodiments, when a private transaction mode is used, the transaction-initiating party may apply a homomorphic encryption algorithm to encrypt the transaction amount of each blockchain-based transaction, and send verification information for verifying the ciphertext transaction amount along with the common transaction data containing the ciphertext transaction amount to each transaction-relay party and the transaction-target party, so that the transaction-relay parties and the transaction-target party can verify the ciphertext transaction amount contained in the common transaction data and determine whether the ciphertext transaction amount corresponds to the foregoing transaction amount. For example, when a Pedersen commitment mechanism is applied to encrypt the transaction amount t of a blockchain-based transaction, a transaction commitment T may be generated by performing calculation on a random number r and the transaction amount t based on the Pedersen commitment mechanism, and the common transaction data contains the transaction commitment T but may not contain the transaction amount t. Thus, the transaction-initiating party may send the transaction amount t and the random number r to relevant transaction parties which verify the transaction commitment T contained in the common transaction data (for example, to determine whether the transaction commitment T corresponds to the transaction amount t).

Figure 2:
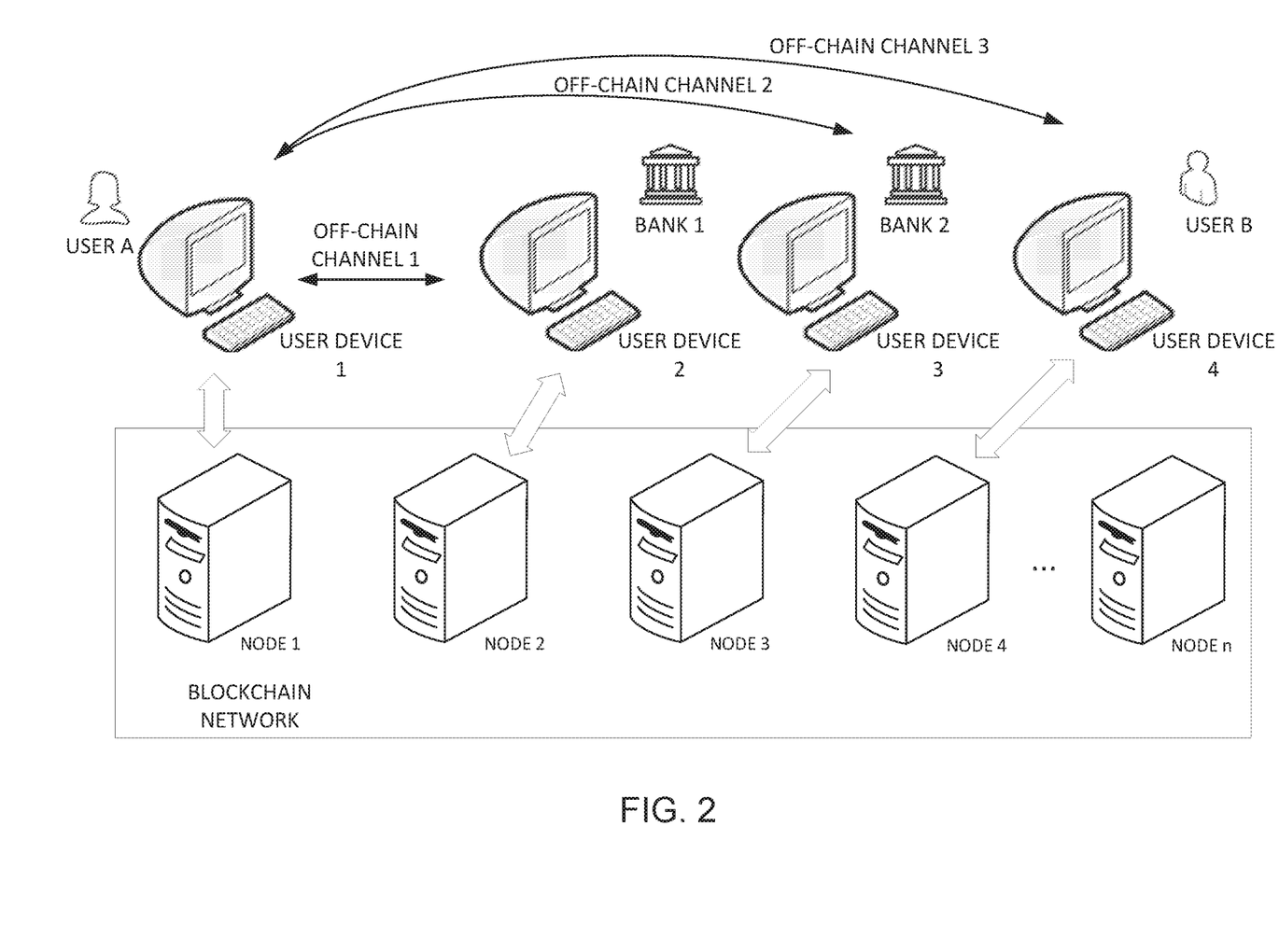
FIG. 2 is a schematic diagram of an implementation of a remittance transaction in a blockchain network according to some embodiments.

A remittance transaction in a blockchain network is taken as an example below to describe the technical solution of the present specification in detail. FIG. 2 is a schematic diagram of implementation of a remittance transaction in a blockchain network according to various embodiments. As shown in FIG. 2, it is assumed that a user A remits to a user B in a blockchain. A "user" and "bank" in the present specification may each be manifested as a login account, while this account may belong to an individual or an organization. This is not limited by the embodiments of the present specification.

It is assumed that a remitter device used by the user A is a user device 1. For instance, an account corresponding to the user A is logged in on this user device 1. Similarly, a receiver device used by the user B is a user device 4. An off-chain channel 1 may be established between the user device 1 and user device 4 to achieve corresponding off-chain communication. The user devices 1-4 may be computing devices as described above.

A client program of blockchain may be run on the user device 1 so that the user device 1 runs a corresponding blockchain node in the blockchain network, such as the node 1 shown in FIG. 2. Similarly, a client program of blockchain may be run on the user device 4 so that the user device 2 also runs a corresponding blockchain node in the blockchain network, such as the node 4 shown in FIG. 2. The blockchain network also includes other blockchain nodes, such as the node n shown in FIG. 2. The blockchain nodes are not enumerated here. Through the foregoing node 1, node 4, etc., the remittance transaction between the user A and the user B may be implemented via the blockchain network, and related transaction information may be recorded in the blockchain ledger maintained by the blockchain nodes respectively, thereby preventing the recorded transaction information from being tampered with, and also facilitating subsequent inspection.

Figure 3:
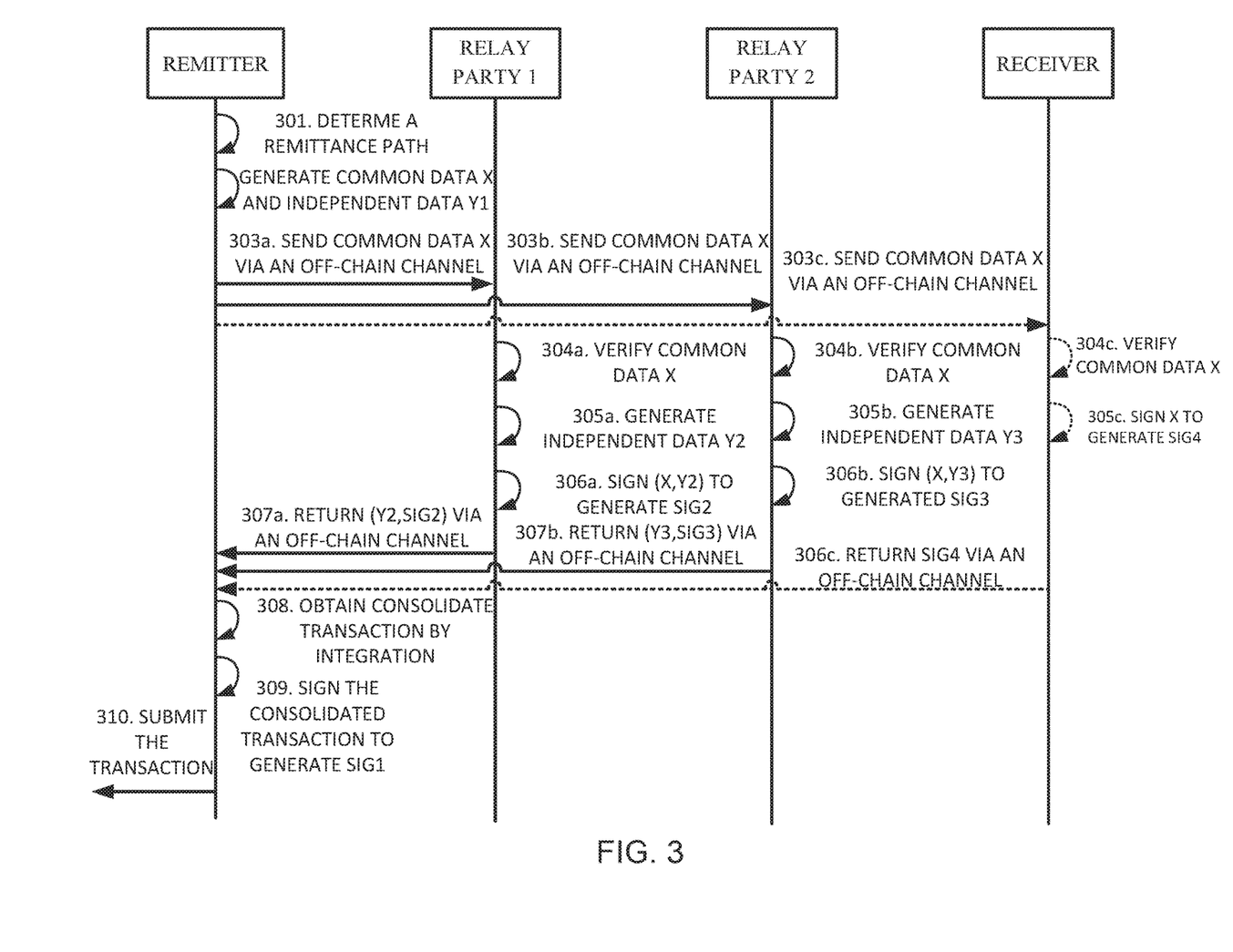
FIG. 3 is a flowchart of an implementation of a remittance transaction in a blockchain network according to some embodiments.

With respect to the scenario of the remittance transaction shown in FIG. 2, FIG. 3 is a flowchart of implementation of a remittance transaction in a blockchain network according to some embodiments. As shown in FIG. 3, the process of interaction among the remitter, a relay party 1, a relay party 2, and the receiver may comprise the following steps 301-310.

Step 301, the remitter determines a remittance path.

In some embodiments, a remitter may refer to a computing device used by an individual or entity to remit a fund and other resources in a remittance transaction, and correspondingly, a receiver may refer to a computing device used by an individual or entity to receive a fund and other resources in a remittance transaction. For example, in the embodiments shown in FIG. 2, User Device 1 is configured as a remitter of a remittance transaction, while User Device 4 is configured as a receiver of the remittance transaction.

In some embodiments, the remitter can determine a remittance transaction path (also referred to as a remittance path) between the remitter and the receiver to effectuate the remittance from a user A to a user B. For example, in the embodiments as shown in FIG. 2, the remittance path determined by the remitter may be as follows: user A→bank 1→bank 2→user B. That is, the user A remits money to the bank 1, the bank 1 remits money to the bank 2, and the bank 2 remits money to the user B, so that a fund and other sources remitted by the user A are remitted to the user B, thereby effectuating the remittance from the user A to user B.

In some embodiments, the remitter may determine a remittance path by a number of methods. By way of example, the remitter may invoke an smart contract for determining remittance paths in the blockchain through the node 1 to determine a corresponding remittance path.

In some embodiments, a number of remittance paths may be available between a remitter and a receiver, and a desired remittance path may be selected from these paths based on selection conditions. For example, these selection conditions may comprise at least one of the following: the lowest remittance fee, the shortest path (e.g., the remittance path that has the fewest relay parties), and the most reliable relay parties. For example, in the embodiments as shown in FIG. 2, the bank 1 and the bank 2 are on the selected remittance path, the User Device 2 corresponding to the bank 1 is configured as the relay party 1, and the User Device 3 corresponding to the bank 2 is configured as the relay party 2. A client program of blockchain may be operated on the User Device 2 so that the User Device 2 has a corresponding blockchain node in the blockchain network, such as the node 2 shown in FIG. 2, and a client program of blockchain may be operated on the User Device 3 so that the User Device 3 has a corresponding blockchain node in the blockchain network, such as the node 3 shown in FIG. 2.

Step 302, the remitter generates common data X and independent data Y1.

In some embodiments, the following blockchain-based transactions involved in the remittance operation are determined for the determined remittance path: the blockchain-based transaction 1 between the remitter and the relay party 1, the blockchain-based transaction 2 between the relay party 1 and the relay party 2, and the blockchain-based transaction 3 between the relay party 2 and the receiver. In some embodiments, the blockchain-based transaction 1, the blockchain-based transaction 2 and the blockchain-based transaction 3 can be implemented together (e.g., in a bundle) so that the blockchain-based transactions 1-3 can be all successfully executed on-chain at the same time or synchronously, or all fail to be executed.

In some embodiments, the common data X is related to the foregoing blockchain-based transactions 1-3, and as transaction parties entering into the blockchain-based transactions 1-3, the relay party 1 and the relay party 2 may verify the common data X. In some embodiments, as a transaction party entering into the blockchain-based transaction 3, the receiver may verify the common data X as well.

In some embodiments, the independent data Y1 is related to the blockchain-based transaction 1 into which the remitter enters, and therefore may not be verified by the relay party 1, the relay party 2, the receiver, and other transaction parties.

In some embodiments, the common data X may contain the following: a transaction amount t1 of the blockchain-based transaction 1, a transaction amount t2 of the blockchain-based transaction 2, and a transaction amount t3 of the blockchain-based transaction 3. A remittance fee charged by the relay party 1 may be the difference between t1 and t2, i.e., t1-t2, and a remittance fee charged by the relay party 2 may be the difference between t2 and t3, i.e., t2-t3.

In some embodiments, when a non-private transaction mode is used for conducting the transactions, the foregoing transaction amount t1, transaction amount t2, and transaction amount t3 contained in the common data X may be plaintext. When a private transaction mode is used for conducting the transactions, ciphertext of the foregoing transaction amount t1, transaction amount t2, and transaction amount t3 may be contained in the common data X. For example, ciphertext of the transaction amount t1 of the blockchain-based transaction 1 may be calculated based on a homomorphic encryption algorithm and included in the common data X. For example, the ciphertext of transaction amount t1 may be a transaction commitment T1 generated based on the Pedersen commitment mechanism. Similarly, a transaction commitment T2 may be calculated from the transaction amount t2 of the blockchain-based transaction 2 based on the Pedersen commitment mechanism and included in the common data X, and a transaction commitment T3 may be calculated from the transaction amount t3 of the blockchain-based transaction 3 based on the Pedersen commitment mechanism and included in the common data X. For example, the transaction commitment T1 may refer to a commitment of the transaction amount t1; the transaction commitment T2 may refer to a commitment of the transaction amount t2; the transaction commitment T3 may refer to a commitment of the transaction amount t3.

In some embodiments, when the Pedersen commitment mechanism or the like is used to generate the foregoing transaction commitments T1-T3, the calculation involves random numbers r1-r3 corresponding to these transaction commitments T1-T3 respectively. For example, the transaction commitment T1 may be calculated according to $T1=\text{Comm}(r1,t1)=g^{r1}h^{t1}$ (g, h are the known parameters in the algorithm), the transaction commitment T2 may be calculated according to $T2=\text{Comm}(r2,t2)=g^{r2}h^{t2}$ and the transaction commitment T3 may be calculated according to $T3=\text{Comm}(r3,t3)=g^{r3}h^{t3}$. Therefore, the random number r1 corresponding to the transaction commitment T1, the random number r2 corresponding to the transaction commitment T2, and the random number r3 corresponding to the transaction commitment T3 may be obtained and sent along with the common data X to the other transaction parties via off-chain channels 1-3 respectively, so that the other transaction parties can verify the transaction amounts corresponding to the commitments T1-T3 based on the random numbers r1-r3 respectively. Alternatively, if a homomorphic encryption algorithm used for generating the transaction commitments T1-T3 does not require additional data such as random numbers, additional data may not be obtained or sent. The specification has no limitation to this.

In some embodiments, the independent data Y1 may be different to some extent in different situations. For example, when the account balance model is used for conducting the transactions, the independent data Y1 may contain a blockchain account address D1 of the remitter, so that the foregoing transaction amount t1 is subtracted from an account balance of the blockchain account address D1. For another example, when the UTXO model is used for conducting the transactions, the independent data Y1 may contain an input of the blockchain-based transaction 1. The input may include one or more assets held by the remitter. An asset amount represented by each asset may not be a fixed amount, and an asset amount represented by the input may be greater than the transaction amount t1 of the blockchain-based transaction 1, so the independent data Y1 may further comprise a change output of the blockchain-based transaction 1. An amount of the change output is the difference between the asset amounts represented by the input and the transaction amount t1, and the change output is credited back to the remitter.

In some embodiments, when a non-private mode is used for conducting the transactions, the blockchain account address or the change output contained in the independent data Y1 may be plaintext, such as a change amount z1. For example, a non-private mode refers to a mode in which a transaction may be conducted without the data related to the transaction being encrypted (e.g., plaintext data may be used to conduct the transaction). In other embodiments, a private mode may refer to a mode in which the data related to a transaction is encrypted for conducting the transaction while protecting the privacy of the parties participating in the transaction. When a private mode is used for conducting the transactions, the blockchain account address or the change output contained in the independent data Y1 may be ciphertext. For example, a change amount commitment Z1 (also referred to as a commitment of the change amount) may be calculated from the change amount z1 of the blockchain-based transaction 1 based on the Pedersen mechanism and used as the change output. In some embodiments, the calculation used to generate the change amount commitment Z1 based on the Pedersen mechanism or the like may involve random number rz1 corresponding to the change amount commitment Z1. However, the independent data Y1 may not contain the random number rz1.

In some embodiments, when a private mode is used, the remitter may use range proof technologies such as the Bulletproofs solution or the Borromean ring signature solution to generate a range proof PR1 related to the blockchain-based transaction 1 according to the transaction amount t1, the random number r1, etc. The range proof PR1 allows the blockchain nodes in the blockchain network to verify whether the transaction amount t1 of the blockchain-based transaction 1 meets the condition that t1≥0 in a ciphertext state.

Further, in addition to the range proof PR, other proofs may also be generated in the private mode. For example, when an account balance model is used for conducting the transactions, a balance-sufficiency proof may also be generated for verifying that the blockchain account balance s1 held by the remitter is not smaller than the transaction amount t1. For example, the balance-sufficiency proof may be generated according to the balance commitment S1 corresponding to the blockchain account balance s1 (e.g., a commitment S1 of the blockchain account balance s1 generated according to a homomorphic encryption algorithm), the transaction amount t1, the transaction commitment T1, the random number r1, etc., and relevant verification is achieved by technologies such as knowledge signature and zero-knowledge proof. For another example, when the UTXO model is used for conducting the transactions, an input-output balance proof may be generated for verifying that the amount of the input (e.g., the sum of the asset amounts represented by the n assets input by the remitter) of a transaction is equal to that of the output (e.g., the sum of the change amount z1 and the transaction amount t1) of the transaction. For example, the input-output balance proof may be generated according to an asset commitment K of an asset amount k corresponding to each asset in the n assets, the transaction amount t1, the transaction commitment T1, the random number r1, the change amount z1, the change amount commitment Z1, etc., and relevant verification is achieved by technologies such as knowledge signature and zero-knowledge proof.

In some embodiments, the independent data Y1 may be contained in the common data X, or the independent data Y1 may be independent from the common data X. The specification has no limitation to this.

In some embodiments, when the independent data Y1 is independent from the common data X, the remitter does not necessarily generate the independent data Y1 in Step 302. In fact, the remitter may generate the independent data Y1 at any time before Step 308 is performed, which is not limited by the specification.

Step 303a, the remitter sends the common data X to the relay party 1 via the off-chain channel 1.

In some embodiments, when a non-private mode is used, the remitter may send the common data X to the relay party 1, so that the relay party 1 can verify the transaction amount t1 and/or other data contained in the common data X.

In some embodiments, when a private mode is used, the remitter may also send the transaction amount t1 and the random number r1, in addition to the common data X, to the relay party 1 so that the relay party 1 can verify the transaction commitment T1 contained in the common data X according to the transaction amount t1 and the random number r1.

Step 304a, the relay party 1 verifies the common data X.

In some embodiments, the relay party 1 may verify any content contained in the common data X to determine whether the relevant blockchain-based transaction is allowed to be implemented.

In some embodiments, the relay party 1 may verify the content in the common data X related to the blockchain-based transaction 1 and the blockchain-based transaction 2 into which the relay party 1 enters. For example, the relay party 1 may verify the transaction amount t1 of the blockchain-based transaction 1 and the transaction amount t2 of the blockchain-based transaction 2, to ensure that enough assets are obtained through the blockchain-based transaction 1 and the assets are transferred out through the blockchain-based transaction 1 after the remittance fee has been deducted.

In some embodiments, when the common data X includes encrypted data (e.g., the transaction commitment T1 corresponding to the blockchain-based transaction 1 and the transaction commitment T2 corresponding to the blockchain-based transaction 2), the relay party 1 may verify the transaction commitment T1 and the transaction commitment T2 based on the Pedersen commitment mechanism to determine whether the commitments T1 and T2 are obtained by encrypting the transaction amount t1 and the transaction amount t2 respectively. For example, the above-mentioned random numbers r1-r2 may be required for the verification. The transaction commitment T1=Comm(r1,t1) indicates that the transaction commitment T1 is obtained by encrypting the transaction amount t1, and the transaction commitment T2=Comm(r2,t2) indicates that the transaction commitment T2 is obtained by encrypting the transaction amount t2.

Step 305a, the relay party 1 generates independent data Y2.

In some embodiments, the independent data Y2 is related to the blockchain-based transaction 2 into which the relay party 1 enters and related to the relay party 1, and therefore may not necessarily be verified by the relay party 1, the relay party 2, the receiver, and other transaction parties.

In some embodiments, when an account balance model is used for conducting the transactions, the independent data Y2 may contain a blockchain account address D2 of the relay party 1, to enable the foregoing transaction amount t2 to be subtracted from the account balance of the blockchain account address D2.

In some embodiments, when the UTXO model is used for conducting the transactions, the independent data Y2 may contain the input and a change output of the blockchain-based transaction 2. The input may include one or more assets held by the relay party 1.

When a non-private mode is used for conducting the transactions, the blockchain account address or the change output contained in the independent data Y2 may be plaintext, such as a change amount z1; when a private mode is used for conducting the transactions, the blockchain account address or the change output contained in the independent data Y2 may be ciphertext. For example, a change amount commitment Z2 may be calculated from the change amount z2 of the blockchain-based transaction 2 by the homomorphic encryption algorithm and used as the change output. In some embodiments, the calculation used to generate the change amount commitment Z2 based on the Pedersen mechanism or the like involves a random number rz2 corresponding to the change amount commitment Z2. However, the independent data Y2 may not contain the random number rz2.

In some embodiments, when a private mode is used, the relay party 1 may adopt range proof technologies to generate a range proof PR2, a balance-sufficiency proof (based on the account balance transaction model) or an input-output balance proof (based on the UTXO transaction model) related to the blockchain-based transaction 2, so as to allow the blockchain nodes in the blockchain network to verify whether the blockchain-based transaction 2 meets relevant requirements in a ciphertext state.

In fact, the description of the independent data Y2 is similar to the relevant description of the independent data Y1 generated by the remitter. References can be made to the relevant description of the independent data Y1 as described above, which will not be repeated herein.

Step 306a, the relay party 1 signs the common data X and independent data Y2 (X,Y2) to generate a signature SIG2.

Step 307a, the relay party 1 returns the pair of the independent data Y2 and the signature SIG2 (Y2,SIG2) to the remitter via the off-chain channel 1.

In some embodiments, the relay party 1 signs (X,Y2) with its private key to generate the signature SIG2, which indicates the acceptance of the common data X and can prevent, by verifying the signature SIG2 subsequently, the common data X or the independent data Y2 contained in the consolidated transaction submitted to the blockchain from being tampered with.

In some embodiments, when a non-private mode is used, the relay party 1 signs (X,Y2) with the private key corresponding to the relay party 1's identity. When a private mode is used, for example, according to a privacy protection technique, a pair of temporary public and private keys can be generated for each blockchain-based transaction, and then the relay party 1 may sign (X,Y2) by using the temporary private key corresponding to the blockchain-based transaction 1.

In some embodiments, in addition to signing (X,Y2), the relay party 1 may also sign the hash values of X and Y2, which are not limited by the specification.

Step 303b, the remitter sends the common data X to the relay party 2 via the off-chain channel 2.

In some embodiments, when a non-private mode is used, the remitter may send the common data X to the relay party 2, so that the relay party 2 can verify the transaction amount t2 and/or other data contained in the common data X.

In some embodiments, when a private mode is used, the remitter may also send the transaction amount t2 and the random number r2 to the relay party 2 in addition to the common data X, so that the relay party 2 can verify the transaction commitment T2 contained in the common data X according to the transaction amount t2 and the random number r2.

In some embodiments, in addition to the manner shown in FIG. 2 that the off-chain channel 2 is established between User Device 1 and User Device 3, the off-chain channel 2 may be established in other manners. The specification has no limitation to this. For example, an off-chain channel is established between User Device 1 and the User Device 2, as well as between User Device 2 and the User Device 3 respectively, so that the off-chain channel 2 is established in the form of "User Device 1↔User Device 2↔User Device 3."

Step 304b, the relay party 2 verifies the common data X.
Step 305b, the relay party 2 generates independent data Y3.
Step 306b, the relay party 2 signs the common data X and the independent data Y3 (X,Y3) to generate a signature SIG3.
Step 307b, the relay party 2 returns the independent data Y3 and the signature SIG3 (Y3,SIG3) to the remitter via the off-chain channel 2.

In some embodiments, the foregoing steps 303a-307a may be referred to for steps 303b-307b, which will not be elaborated herein.

Step 303c, the remitter sends the common data X to the receiver via the off-chain channel 3.

In some embodiments, when a non-private mode is used, the remitter may send the common data X to the receiver, so that the receiver can verify the transaction amount t3 and/or other data contained in the common data X.

In some embodiments, when a private mode is used, the remitter may also send the transaction amount t3 and the random number r3 to the receiver in addition to the common data X, so that the receiver can verify the transaction commitment T3 contained in the common data X according to the transaction amount t3 and the random number r3.

In some embodiments, in addition to the manner shown in FIG. 2 that the off-chain channel 3 is established between User Device 1 and User Device 4, the off-chain channel 3 may be formed in other manners. The specification has no limitation to this. For example, an off-chain channel is established between User Device 1 and the User Device 2, between User Device 2 and the User Device 3, as well as between User Device 3 and the User Device 4 respectively, so that the off-chain channel 3 is established in the form of "User Device 1↔User Device 2↔User Device 3↔User Device 4." For another example, an off-chain channel is established between User Device 1 and the User Device 2 as well as between User Device 2 and the User Device 4 respectively, so that the off-chain channel 3 is established in the form of "User Device 1↔User Device 2↔User Device 4."

Step 304c, the receiver verifies the common data X.
Step 305c, the receiver signs X to generate a signature SIG4.
Step 306c, the receiver returns SIG4 to the remitter via the off-chain channel 3.

In some embodiments, when a non-private mode is used, Steps 303c-306c may be skipped, and the process proceeds to Step 308. But when a private mode is used, Steps 303c-306c may be performed to allow the receiver to verify the common data, for example, to verify the transaction commitment T3 contained in the common data X according to the random number r3 and the transaction amount t3 provided by the remitter, so as to determine whether the transaction commitment T3 is obtained by encrypting the transaction amount t3.

In some embodiments, with respect to Steps 303c-306c, references can be made to the above-described Steps 303c-307c, which will not be elaborated herein.

Step 308, the remitter obtains a consolidate transaction corresponding to the blockchain-based transactions 1-3 by integrating the common data X, the independent data Y1-Y3 and the signatures SIG2-SIG4.

In some embodiments, when a non-private mode is used, Steps 303c-306c may not be implemented, so the consolidated transaction may not contain the signature SIG4.

Step 309, the remitter signs the consolidated transaction to generate a signature SIG1.

In some embodiments, the remitter may sign the hash value of the consolidated transaction. The specification has no limitation to this.

Step 310, the remitter submits the consolidated transaction and the signature SIG1 to the blockchain in an associated manner.

In some embodiments, the consolidated transaction is submitted to the blockchain, so that all blockchain nodes in the blockchain may verify the consolidated transaction independently to execute the remittance when the verification is successful, or to reject the remittance when the verification is not successful. Since all transaction data of the blockchain-based transactions 1-3 are integrated into a consolidated transaction, the execution of the consolidated transaction in the blockchain is equivalent to the concurrent execution of the blockchain-based transactions 1-3, thus avoiding the situation in which some of the blockchain-based transactions succeed while the others fail.

In some embodiments, the blockchain nodes' verification of the consolidated transaction may comprise the use of the double-spending prevention mechanism or replay attack prevention mechanism to verify if the remittance transaction has been executed, the inspection of the signatures contained in the consolidated transaction, the inspection of the range proof contained in the consolidated transaction when a private mode is used, and other possible verifications, which are not limited by the specification.

In some embodiments, the remitter may not sign the consolidated transaction, but sign (X,Y1) to generate SIG1, similar to what the relay parties 1-2 do. The SIG1 is integrated into the consolidated transaction in Step 308, then Step 309 may be skipped, and in Step 310, the consolidated transaction may be submitted to the blockchain.

Figure 4:
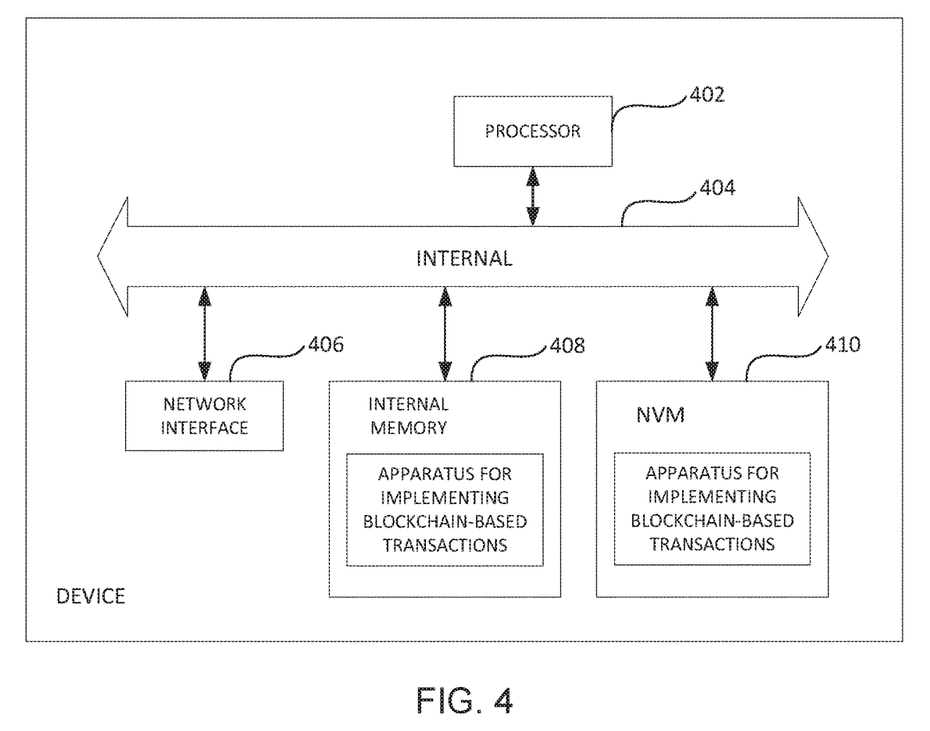
FIG. 4 is a schematic structural diagram of a device for implementing blockchain-based transactions according to some embodiments.

FIG. 4 is a schematic structural diagram of a device according to some embodiments. As shown in FIG. 4, at a hardware level, the device comprises a processor 402, an internal bus 404, a network interface 406, an internal memory 408, and a nonvolatile memory (NVM) 410. The device may further comprise other pieces of hardware. In some embodiments, the processor 402 reads corresponding computer programs from the NVM 410 to the internal memory 408 and then executes the computer program to form a blockchain-based transaction apparatus at a logical level. In addition to the software implementation manner, one or more embodiments of the specification do not exclude other implementation manners, such as a logic device or a combination of software and hardware. That is, the executive bodies of the following processing flow are not limited to logic units and may be hardware or logic devices.

Figure 5:
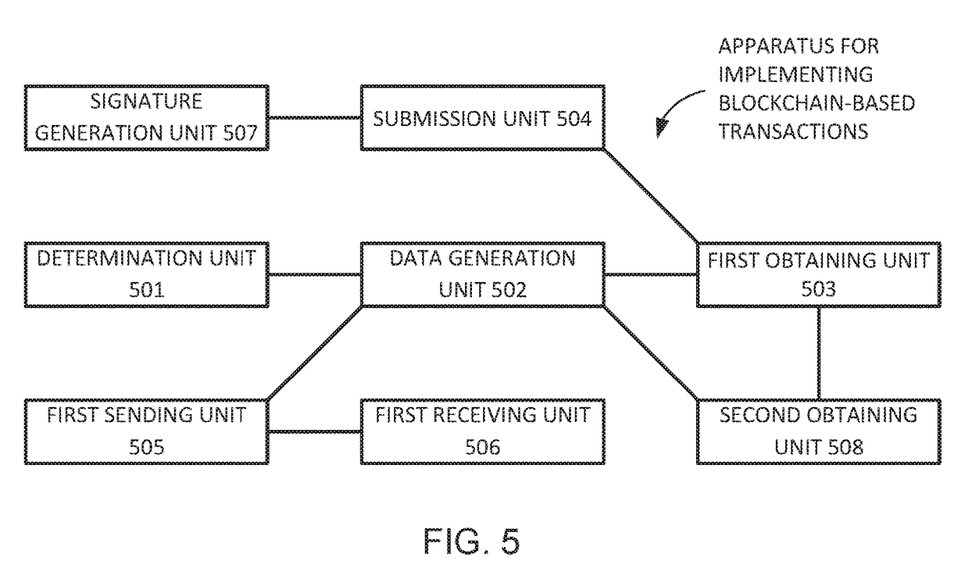
FIG. 5 is a block diagram of an apparatus for implementing blockchain-based transactions according to some embodiments.

Referring to FIG. 5, a block diagram of an apparatus for implementing blockchain-based transactions is illustrated according to some embodiments. As shown in FIG. 5, in the software implementation manner, the apparatus for implementing blockchain-based transactions is implementable by a computing device as a transaction-initiating party device and may comprise: a determination unit 501 for determining a transaction path for multiple blockchain-based transactions to be executed together, the transaction path comprising a transaction-initiating party, a transaction-relay party and a transaction-target party; a data generation unit 502 for generating first transaction data, wherein the first transaction data comprises common transaction data and first independent transaction data, wherein the common transaction data is related to the multiple blockchain-based transactions, and the first independent transaction data is related to one or more of the multiple blockchain-based transactions into which the transaction-initiating party enters; a first obtaining unit 503 for obtaining second transaction data which comprises second independent transaction data, wherein the second independent transaction data is generated by the transaction-relay party for one or more of the multiple blockchain-based transactions into which the transaction-relay party enters when verification of the common transaction data is successful; and a submission unit 504 for submitting a consolidated transaction related to the multiple blockchain-based transactions to a blockchain, wherein the consolidated transaction comprises the first transaction data and the second transaction data.

In some embodiments, the apparatus further comprises: a first sending unit 505 for sending the first transaction data or the common transaction data to the transaction-relay party device via an off-chain channel, for the transaction-relay party device to verify the common transaction data; and a first receiving unit 506 for receiving the second transaction data from the transaction-relay party via the off-chain channel.

In some embodiments, the apparatus further comprises: a signature generation unit 507 for generating a first signature by using the private key of the transaction-initiating party, wherein the first signature is related to the common transaction data and the first independent transaction data, or related to the consolidated transaction; and the submitting unit 504 also submits the first signature and the consolidated transaction to the blockchain in an associated manner.

In some embodiments, the second transaction data further comprises a second signature which is generated by the transaction-relay party signing with a private key the transaction-relay party holds, and the second signature is related to the common transaction data and the second independent transaction data.

In some embodiments, the common transaction data comprises an individual transaction amount of each of the multiple blockchain-based transactions; the first independent transaction data comprises one or more first input assets of the transaction-initiating party corresponding to the one or more blockchain-based transactions into which the transaction-initiating party enters; and the second independent transaction data comprises one or more second input assets of the transaction-relay party corresponding to the one or more blockchain-based transactions into which the transaction-relay party enters.

In some embodiments, the first independent transaction data further comprises one or more first change output assets of the transaction-initiating party corresponding to the one or more blockchain-based transactions into which the transaction-initiating party enters; and the second independent transaction data further comprises one or more second change output assets of the transaction-relay party corresponding to the one or more blockchain-based transactions into which the transaction-relay party enters.

In some embodiments, when a private transaction mode is used for conducting the consolidated transaction, the first independent transaction data further comprises a first range proof, and the second independent transaction data further comprises a second range proof; wherein in the UTXO transaction model, the first independent transaction data further comprises a proof that an input and output of each of the one or more blockchain-based transactions into which the transaction-initiating party enters are equal, and the second independent transaction data further comprises a proof that an input and output of each of the one or more blockchain-based transactions into which the transaction-relay party enters are equal; and in an account balance transaction model, the first independent transaction data further comprises a proof that an account balance held by the transaction-initiating party is not smaller than a total transaction amount of the one or more blockchain-based transactions into which the transaction-initiating party enters, and the second independent transaction data further comprises a proof that an account balance held by the transaction-relay party is not smaller than a total transaction amount of the one or more blockchain-based transactions into which the transaction-relay party enters.

In some embodiments, the apparatus further comprises: a second obtaining unit 508 for in a private transaction mode for carrying out the consolidated transaction, obtaining third transaction data, wherein the third transaction data comprises a third signature which is generated by the transaction-target party signing the common transaction data with a private key the transaction-target party holds in response to the verification of the common transaction data being successful.

The systems, apparatuses, modules, or units illustrated in the foregoing embodiments may be achieved by computer chips or entities, or by products with certain functions. A typical achievement device is a computer. An example of the computer may be a personal computer, a laptop computer, a cell phone, a camera phone, a smart phone, a PDA (personal digital assistant), a media player, a navigation device, an email sending and receiving device, a game console, a tablet computer, a wearable device, or any combination of a few of these devices.

In a typical configuration, the computer comprises one or more processors (CPU), I/O interfaces, network interfaces and internal memories.

The internal memory may be in a form of volatile memory, random access memory (RAM) and/or non-volatile memory such as read-only memory (ROM) or flash memory (flash RAM) in the computer readable media. Internal memory is an example of computer readable media.

Computer readable media include non-volatile and volatile, movable and non-movable media and may achieve information storage by any method or technology. Information may be computer readable instructions, data structures, program modules or other data. Examples of computer storage media include, but are not limited to, phase change random access memory (PRAM), static random access memory (SRAM), dynamic random access memory (DRAM) and other types of random access memory (RAM), read only memory (ROM), electrically erasable programmable read only memory (EEPROM), flash memory or other memory technologies, compact disc-read only memory (CD-ROM), digital versatile disc (DVD) or other optical memory, cassette type magnetic tape, magnetic disk memory, quantum memory, graphene-based storage media, or other magnetic storage devices or any other non-transfer media, which may be used to store information that is accessible to computing devices. According to the specification, computer readable media do not include transitory media, such as modulated data signals and carriers.

It should be further noted that the terms "include," "contain" or any other variants thereof are intended to cover non-exclusive inclusion so that a process, method, product, or device that include a set of elements not only include those elements but also include other elements that are not expressly listed, or also include the elements inherent to such process, method, product or device. In the absence of more limitations, the elements defined by the sentence "include one . . . " do not exclude that other identical elements that are included in the process, method, product or device including the elements.

Embodiments of the specification are described above. Other embodiments are in the scope of the attached claims. In some embodiments, the actions or steps recorded in the claims may be executed in a sequence different from that given in the embodiments and can still achieve the expected results. Further, it is not necessary for the process described in the accompanying drawings to require the given specific sequence or a continuous sequence in order to achieve the expected results. In some embodiments, multitasking processing and parallel processing are also acceptable or may be favorable.

The terms used in one or more embodiments of the specification are for the purpose of describing embodiments and not intended to limit one or more embodiments of the specification. The singular forms "one," "the" and "this" used in one or more embodiments of the specification and in the attached claims also are intended to cover plural forms unless other meanings are clearly indicated in the context. It should also be understood that the term "and/or" used in the text refers to any or all possible combinations containing one or more the associated listed items.

It should be understood that although one or more embodiments of the specification may use terms such as first, second and third to describe various kinds of information, the information should not be limited to these terms. These terms may differentiate information of the same type. For example, without departing from the scope of one or more embodiments of the specification, first information may also be referred to as second information, and similarly, second information may also be referred to as first information. Subject to the context, term "if" used here may be interpreted as "at the time of . . . ," "when . . . . ," or "in response to determination."

The foregoing description is not intended to limit one or more embodiments of the specification. Any modifications, equivalent replacements and improvements made without departing from the spirit and principle of one or more embodiments of the specification shall fall within the scope of one or more embodiments of the specification.

What is claimed is:

1. A method, comprising:
   determining, by invoking a smart contract at a first computing device of a remitter, a remittance path involving some of a plurality of blockchain nodes of a blockchain computer network, wherein the remittance path effectuates a remittance transaction from the remitter to a receiver through a relay party, each of the remitter, receiver, and relay party corresponds to one of the some blockchain nodes, and the smart contract is stored in a blockchain that is on the blockchain computer network;
   determining, at the first computing device, based on the remittance path and a remittance fee charged by the relay party, a first transaction amount to be remitted from a blockchain account of the remitter to a blockchain account of the relay party, and a second transaction amount to be remitted from the blockchain account of the relay party to a blockchain account of the receiver, the remittance fee being less than or equal to a difference between the first transaction amount and the second transaction amount, and the blockchain accounts of the remitter, relay party, and receiver corresponding to the blockchain computer network;
   generating, at the first computing device, a first ciphertext of the first transaction amount by applying a homomorphic encryption algorithm to the first transaction amount according to a first random number;
   generating, at the first computing device, a second ciphertext of the second transaction amount by applying the homomorphic encryption algorithm to the second transaction amount according to a second random number;
   sending, at the first computing device, based on the remittance path via a first non-blockchain computer network, to a second computing device of the relay party, the first transaction amount, the first random number, the first ciphertext, the second transaction amount, the second random number, and the second ciphertext;
   receiving, at the first computing device via the first non-blockchain computer network from the second computing device, a third ciphertext of a blockchain account address corresponding to the blockchain account of the relay party, and a first digital signature corresponding to the relay party and indicating that the relay party endorses the first ciphertext, the second ciphertext, and the third ciphertext, wherein the first digital signature is generated by a computing device associated with the relay party using a first temporary private key;
   sending, at the first computing device, based on the remittance path via a second non-blockchain computer network, to a third computing device of the receiver, the second transaction amount, the second random number, and the second ciphertext;

receiving, at the first computing device via the second non-blockchain computer network from the third computing device, a fourth ciphertext of a blockchain account address corresponding to the blockchain account of the receiver, and a second digital signature corresponding to the receiver and indicating that the receiver endorses the second ciphertext and the fourth ciphertext, wherein the second digital signature is generated by a computing device associated with the receiver using a second temporary private key, wherein the first and second temporary private keys are generated by blockchain nodes of the blockchain for the remittance transaction;

generating, at the first computing device, a fifth ciphertext of a blockchain address of the blockchain account of the remitter by applying the homomorphic encryption algorithm to the blockchain address according to a third random number;

generating, at the first computing device, a consolidated blockchain transaction comprising: the first ciphertext, the second ciphertext, the third ciphertext, the fourth ciphertext, the fifth ciphertext, the first digital signature, and the second digital signature; and submitting for verification, at the first computing device, the consolidated blockchain transaction to one or more nodes of the blockchain computer network.

2. The method of claim 1, wherein the smart contract comprises a selection condition of selecting a shortest path among the plurality of blockchain nodes.

3. The method of claim 1, wherein:

before submitting for verification, at the first computing device, the consolidated blockchain transaction to the one or more nodes of the blockchain computer network, the method further comprises: generating, at the first computing device, using a private key of the remitter, a third digital signature endorsing the consolidated blockchain transaction; and submitting for verification, at the first computing device, the consolidated blockchain transaction to the one or more nodes of the blockchain computer network comprises:

submitting for verification, at the first computing device, the third digital signature and the consolidated blockchain transaction to the one or more nodes of the blockchain computer network.

4. The method of claim 1, before submitting for verification, at the first computing device, the consolidated blockchain transaction to the one or more nodes of the blockchain computer network, further comprising, generating, at the first computing device, using a private key of the remitter, a third digital signature endorsing the first ciphertext, the second ciphertext, and the fifth ciphertext, wherein the consolidated blockchain transaction comprises the third digital signature.

5. The method of claim 1, further comprising: verifying, at the one or more nodes, the consolidated blockchain transaction by at least verifying, based on a blockchain-based double-spending prevention mechanism or replay attack prevention mechanism, that the consolidated blockchain transaction has not been executed, and validating the first digital signature and the second digital signature.

6. The method of claim 5, further comprising:

generating, at the first computing device, a range proof according to the first transaction amount and the first random number;

verifying, at the one or more nodes, based on the range proof, that the first transaction amount to be remitted from the blockchain account of the remitter to the blockchain account of the relay party is greater than or equal to zero.

7. The method of claim 1, wherein the homomorphic encryption algorithm is a Pedersen Commitment mechanism.

8. The method of claim 1, further comprising:

verifying, at the second computing device, the first ciphertext of the first transaction amount by determining that the first ciphertext is obtained by applying the homomorphic encryption algorithm to the first transaction amount according to the first random number, verifying, at the second computing device, the second ciphertext of the second transaction amount by determining that the second ciphertext is obtained by applying the homomorphic encryption algorithm to the second transaction amount according to the second random number; and after verifying the first ciphertext and the second ciphertext, generating at the second computing device, using a private key of the relay party, the first digital signature.

9. The method of claim 1, further comprising:

verifying, at the third computing device, the second ciphertext of the second transaction amount by determining that the second ciphertext is obtained by applying the homomorphic encryption algorithm to the second transaction amount according to the second random number, after verifying the second ciphertext, generating at the third computing device, using a private key of the receiver, the second digital signature.

10. One or more non-transitory computer-readable mediums storing instructions executable by one or more processors, wherein execution of the instructions cause the one or more processors to perform operations comprising:

determining, by invoking a smart contract, a remittance path involving some of a plurality of blockchain nodes of a blockchain computer network, wherein the remittance path effectuates a remittance transaction from a remitter to a receiver through a relay party, each of the remitter, receiver, and relay party corresponds to one of the some blockchain nodes, and the smart contract is stored in a blockchain that is on the blockchain computer network;

determining, based on the remittance path and a remittance fee charged by the relay party, a first transaction amount to be remitted from a blockchain account of the remitter to a blockchain account of the relay party, and a second transaction amount to be remitted from the blockchain account of the relay party to a blockchain account of the receiver, the remittance fee being less than or equal to a difference between the first transaction amount and the second transaction amount, and the blockchain accounts of the remitter, relay party, and receiver corresponding to the blockchain computer network;

generating a first ciphertext of the first transaction amount by applying a homomorphic encryption algorithm to the first transaction amount according to a first random number;

generating a second ciphertext of the second transaction amount by applying the homomorphic encryption algorithm to the second transaction amount according to a second random number;

sending, based on the remittance path via a first non-blockchain computer network, to a first computing device of the relay party, the first transaction amount, the first random number, the first ciphertext, the second transaction amount, the second random number, and the second ciphertext;

receiving, via the first non-blockchain computer network from the first computing device, a third ciphertext of a blockchain account address corresponding to the blockchain account of the relay party, and a first digital signature corresponding to the relay party and indicating that the relay party endorses the first ciphertext, the second ciphertext, and the third ciphertext, wherein the first digital signature is generated by a computing device associated with the relay party using a first temporary private key;

sending, based on the remittance path via a second non-blockchain computer network, to a second computing device of the receiver, the second transaction amount, the second random number, and the second ciphertext;

receiving, via the second non-blockchain computer network from the second computing device, a fourth ciphertext of a blockchain account address corresponding to the blockchain account of the receiver, and a second digital signature corresponding to the receiver and indicating that the receiver endorses the second ciphertext and the fourth ciphertext, wherein the second digital signature is generated by a computing device associated with the receiver using a second temporary private key, wherein the first and second temporary private keys are generated by blockchain notes of the blockchain for the remittance transaction;

generating a fifth ciphertext of a blockchain address of the blockchain account of the remitter by applying the homomorphic encryption algorithm to the blockchain address according to a third random number;

generating a consolidated blockchain transaction comprising: the first ciphertext, the second ciphertext, the third ciphertext, the fourth ciphertext, the fifth ciphertext, the first digital signature, and the second digital signature; and submitting for verification the consolidated blockchain transaction to one or more nodes of the blockchain computer network.

11. The one or more non-transitory computer-readable mediums of claim 10, wherein the smart contract comprises a selection condition of selecting a shortest path among the plurality of blockchain nodes.

12. The one or more non-transitory computer-readable mediums of claim 10, wherein:

before submitting for verification the consolidated blockchain transaction to the one or more nodes of the blockchain computer network, the operations further comprise: generating, using a private key of the remitter, a third digital signature endorsing the consolidated blockchain transaction; and submitting for verification the consolidated blockchain transaction to the one or more nodes of the blockchain computer network comprises: submitting for verification the third digital signature and the consolidated blockchain transaction to the one or more nodes of the blockchain computer network.

13. The one or more non-transitory computer-readable mediums of claim 10, wherein before submitting for verification the consolidated blockchain transaction to the one or more nodes of the blockchain computer network, the operations further comprise:

generating, using a private key of the remitter, a third digital signature endorsing the first ciphertext, the second ciphertext, and the fifth ciphertext, wherein the consolidated blockchain transaction comprises the third digital signature.

14. The one or more non-transitory computer-readable mediums of claim 10, wherein the operations further comprise: verifying the consolidated blockchain transaction by at least verifying, based on a blockchain-based double-spending prevention mechanism or replay attack prevention mechanism, that the consolidated blockchain transaction has not been executed, and validating the first digital signature and the second digital signature.

15. The one or more non-transitory computer-readable mediums of claim 14, wherein the operations further comprise:

generating a range proof according to the first transaction amount and the first random number;

verifying, based on the range proof, that the first transaction amount to be remitted from the blockchain account of the remitter to the blockchain account of the relay party is greater than or equal to zero.

16. The one or more non-transitory computer-readable mediums of claim 10, wherein the homomorphic encryption algorithm is a Pedersen Commitment mechanism.

17. The one or more non-transitory computer-readable mediums of claim 10, wherein the operations further comprise:

verifying the first ciphertext of the first transaction amount by determining that the first ciphertext is obtained by applying the homomorphic encryption algorithm to the first transaction amount according to the first random number, verifying the second ciphertext of the second transaction amount by determining that the second ciphertext is obtained by applying the homomorphic encryption algorithm to the second transaction amount according to the second random number; and after verifying the first ciphertext and the second ciphertext, generating, using a private key of the relay party, the first digital signature.

18. A system, comprising:

one or more processors; and one or more non-transitory computer-readable mediums storing instructions executable by one or more processors, wherein execution of the instructions cause the one or more processors to perform operations comprising:

determining, by invoking a smart contract, a remittance path involving some of a plurality of blockchain nodes of a blockchain computer network, wherein the remittance path effectuates a remittance transaction from a remitter to a receiver through a relay party, each of the remitter, receiver, and relay party corresponds to one of the some blockchain nodes, and the smart contract is stored in a blockchain that is on the blockchain computer network;

determining, based on the remittance path and a remittance fee charged by the relay party, a first transaction amount to be remitted from a blockchain account of the remitter to a blockchain account of the relay party, and a second transaction amount to be remitted from the blockchain account of the relay party to a blockchain account of the receiver, the remittance fee being less than or equal to a difference between the first transaction amount and the second transaction amount, and the blockchain accounts of the remitter, relay party, and receiver corresponding to the blockchain computer network;

generating a first ciphertext of the first transaction amount by applying a homomorphic encryption algorithm to the first transaction amount according to a first random number;

generating a second ciphertext of the second transaction amount by applying the homomorphic encryption algorithm to the second transaction amount according to a second random number;

sending, based on the remittance path via a first non-blockchain computer network, to a first computing device of the relay party, the first transaction amount, the first random number, the first ciphertext, the second transaction amount, the second random number, and the second ciphertext;

receiving, via the first non-blockchain computer network from the first computing device, a third ciphertext of a blockchain account address corresponding to the blockchain account of the relay party, and a first digital signature corresponding to the relay party and indicating that the relay party endorses the first ciphertext, the second ciphertext, and the third ciphertext, wherein the first digital signature is generated by a computing device associated with the relay party using a first temporary private key;

sending, based on the remittance path via a second non-blockchain computer network, to a second computing device of the receiver, the second transaction amount, the second random number, and the second ciphertext;

receiving, via the second non-blockchain computer network from the second computing device, a fourth ciphertext of a blockchain account address corresponding to the blockchain account of the receiver, and a second digital signature corresponding to the receiver and indicating that the receiver endorses the second ciphertext and the fourth ciphertext, wherein the second digital signature is generated by a computing device associated with the receiver using a second temporary private key, wherein the first and second temporary private keys are generated by blockchain nodes of the blockchain for the remittance transaction;

generating a fifth ciphertext of a blockchain address of the blockchain account of the remitter by applying the homomorphic encryption algorithm to the blockchain address according to a third random number;

generating a consolidated blockchain transaction comprising: the first ciphertext, the second ciphertext, the third ciphertext, the fourth ciphertext, the fifth ciphertext, the first digital signature, and the second digital signature; and submitting for verification the consolidated blockchain transaction to one or more nodes of the blockchain computer network.

* * * * *